US007636496B2

(12) United States Patent
Duan et al.

(10) Patent No.: US 7,636,496 B2
(45) Date of Patent: *Dec. 22, 2009

(54) HISTOGRAM ADJUSTMENT FOR HIGH DYNAMIC RANGE IMAGE MAPPING

(75) Inventors: Jiang Duan, Norwich (GB); Marco Bressan, LaTronche (FR); Christopher R. Dance, Meylan (FR)

(73) Assignee: Xerox Corporation, Norwalk, CT (US)

( * ) Notice: Subject to any disclaimer, the term of this patent is extended or adjusted under 35 U.S.C. 154(b) by 667 days.

This patent is subject to a terminal disclaimer.

(21) Appl. No.: 11/435,588

(22) Filed: May 17, 2006

(65) Prior Publication Data

US 2007/0268534 A1 Nov. 22, 2007

(51) Int. Cl.
G06K 9/00 (2006.01)
G06K 9/40 (2006.01)

(52) U.S. Cl. ............ 382/274; 382/168; 382/169; 382/254; 345/589; 345/617; 348/234; 348/254

(58) Field of Classification Search ......... 382/162–167, 382/168–171, 182, 232, 254, 274; 345/589, 345/617; 348/234, 254

See application file for complete search history.

(56) References Cited

U.S. PATENT DOCUMENTS

| 4,654,722 | A | * | 3/1987 | Alkofer .................. 382/169 |
| 5,450,502 | A | | 9/1995 | Eschbach et al. |
| 5,581,370 | A | | 12/1996 | Fuss et al. |
| 5,724,456 | A | * | 3/1998 | Boyack et al. ............ 382/274 |
| 6,175,427 | B1 | * | 1/2001 | Lehmbeck et al. .......... 358/1.9 |
| 6,826,310 | B2 | | 11/2004 | Trifonov et al. |
| 6,850,642 | B1 | | 2/2005 | Wang |
| 2004/0075744 | A1 | * | 4/2004 | Newman ................ 348/207.1 |
| 2005/0104900 | A1 | * | 5/2005 | Toyama et al. ........... 345/629 |

FOREIGN PATENT DOCUMENTS

EP 0 848 545 6/1998

OTHER PUBLICATIONS

J.Zhao, et al., Automatic Digital Image Enhancement for Dark Pictures, *IEEE Intl. Conference on Toulouse*, France, May 14-19, 2006.
C.Schlick, Quantization Techniques for Visualization of High Dynamic Range Pictures, *Proceedings of the Eurographics Workshop on Rendering*, Jun. 1994.
G.Qiu, et al., An Optimal Tone Reproduction Curve Operator for the Display of High Dynamic Range Images, *IEEE Intl. Symposium on Kobe,Japan*, May 23-26, 2005.

(Continued)

Primary Examiner—Anand Bhatnagar
Assistant Examiner—Jason Heidemann
(74) Attorney, Agent, or Firm—Fay Sharpe LLP

(57) ABSTRACT

A method of automatic mapping of image data includes representing image data for an image as luminance values, determining a key value as a function of an average luminance value of the image and of minimum and maximum luminance values of the image, generating offset-adjusted luminance values including applying an offset to each of the luminance values, the offset being a function of the determined key value, and computing a tone reproduction curve for at least a region of the image which includes applying a mapping function to the offset-adjusted luminance values.

20 Claims, 6 Drawing Sheets

OTHER PUBLICATIONS

U.S. Appl. No. 11/174,679, filed Jul. 5, 2005, Dance, et al.

P.E. Debevec, J. Malik, *Recovering High Dynamic Range Radiance Maps From Photographs*, Proc. ACM SIGGRAPH'97, pp. 369-378, 1997.

S. Mann, R.W. Picard, *On Being 'Undigital' With Digital Cameras: Extending Dynamic Range By Combining Differently Exposed Pictures*, IS&T's 48th Annual Conference, Society for Imaging Science and Technology, Washington, D.C., pp. 422-428, 1995.

T. Mitsunaga, S.K. Nayar, *High Dynamic Range Imaging: Spatially Varying Pixel Exposures*, Proc. CVPR'2000, vol. 1, pp. 472-479, 2000.

J. Tumblin, G. Turk, *LCIS: A Boundary Hierarchy For Detail Preserving Contrast Reduction*, In Proc. Of ACM SIGGRAPH'99, pp. 83-90, 1999.

F. Durand, J. Dorsey, *Fast Bilateral Filtering For The Display Of High-Dynamic-Range Images*, ACM Trans. Graph. (Special Issue SIGGRAPH'02), 21, 3, pp. 249-256, 2002.

E. Reinhard, M. Stark, P. Shirley, J. Ferwerda, *Photographic Tone Reproduction For Digital Images*, ACM Trans. Graph. (Special Issue SIGGRAPH'02), 21, 3, pp. 267-276, 2002.

R. Fattal, D. Lischinski, M. Werman, *Gradient Domain High Dynamic Range Compression*, ACM Trans. Graph. (Special Issue SIGGRAPH'02), 21, 3, pp. 249-256, 2002.

E. Reinhard, *Parameter Estimation For Photographic Tone Reproduction*, Journal of Graphics Tools, vol. 7, issue 1, pp. 45-52, 2002.

K. Zuiderveld, (ANSI S Code from:) *Contrast Limited Adaptive Histogram Equalization*, Graphics Gems IV, pp. 474-485, Academic Press, 1994, *Graphics Gems, by Category*, pp. 1-14, May 15, 2006.

G.W. Larson, H. Rushmeier, C. Piatko, *A Visibility Matching Tone Reproduction Operator For High Dynamic Range Scenes*, IEEE Trans. On Visualization and Computer Graphics, vol. 3, pp. 291-306, 1997.

J. Duan, G. Qiu, *Fast Tone Mapping For High Dynamic Range Images*, ICPR'04, 17th Intl. Conference on Pattern Recognition, vol. 2, pp. 847-850, 2004.

Newton-Raphson, *Method Using Derivative* Root Finding and Nonlinear Sets of Equations, Numerical Recipes Inc., pp. 362-369, 1992.

K.Zuiderveld, VIII.5 Contrast Limited Adaptive Histogram Equalization, *Computer Vision Research Group*, ISBN 0-12-336156, Academic Press, Inc. 1994.

\* cited by examiner

HISTOGRAM ADJUSTMENT FOR HIGH DYNAMIC RANGE IMAGE MAPPING

CROSS REFERENCE TO RELATED PATENTS AND APPLICATIONS

Application Ser. No. 11/174,679, filed Jul. 5, 2005, entitled "Contrast Enhancement of Images," by Christopher Dance, et al., the disclosure of which is incorporated herein in its entirety by reference, is mentioned.

BACKGROUND

The exemplary embodiment relates to image processing. It finds particular application in connection with the mapping of images from a higher to a lower dynamic range.

The "dynamic range" of a scene, image, or a reproduction device is defined as the ratio between the highest and lowest luminance levels. Recent technologies have made it relatively easy to create radiance maps for High Dynamic Range (HDR) sceneries. Conventional low dynamic range (LDR) reproduction devices, such as printers and CRT monitors, are typically 8-bit, i.e., the luminance can range in integer values from 0 to 255. These devices are not able to directly reproduce high dynamic range images (usually 12, 16, or even 32 bits per channel). However, realistic reproduction of high contrast scenery on conventional reproduction devices is required in the printing industry, photographing industry, and for computer graphics.

If the same quantization step is used to convert from high to low dynamic range, then either the brightest part of the image or the darkest part of the image is often lost. Several tone reproduction techniques for dynamic range compression have been proposed. However, most of these techniques are unable to reproduce the local contrast and fine details of the scenery and tend to introduce artifacts. Techniques that attempt to overcome this drawback are frequently computationally expensive. In addition, these methods generally include image-dependent manual parameter adjustments, which makes them hard to be utilized in an automated display or printing process.

INCORPORATION BY REFERENCE

The following references, the disclosures of which are incorporated herein in their entireties by reference, are mentioned:

U.S. Pat. No. 5,450,502 by Eschbach, et al. discloses a method of improving the global contrast in a natural scene image, in which the image is converted from an original set of color coordinates to an expression where one term has a relationship to overall image intensity. A global histogram of the image is derived for that term, which plots the populations of pixels at each possible level of intensity in the image. The signal describing the histogram is operated on with a filter that weakens strong peaks and valleys in the function, without affecting flat portions of the signal. The filtered histogram signal is used for controlling the TRC mapping in a device at which the image is to be printed. The image is divided into a number of segments, each describable by a local histogram signal for that image segment. Each local histogram signal is compared to the global histogram, to determine which signals are flatter. If any of the local histograms have signals flatter than the global histogram, the signals are summed into a relevant histogram signal and directed to the flattening filter in its place.

U.S. Pat. No. 5,581,370 by Fuss, et al. discloses a method of improving the global contrast in a natural scene image. A relevant histogram of the image is derived from a selected subset of local histograms representing regions of the image. The signal describing the histogram is operated on with a filter that weakens strong peaks and valleys in the function, without affecting flat portions of the signal. The filtered histogram signal is used for controlling the TRC mapping in a device on which the image is to be printed.

U.S. Pat. No. 6,826,310 to Trifonov, et al., discloses a global method of automatic contrast correction which includes representing digital image data in the form of a brightness histogram, determining a measure of central tendency for the histogram, adding a shift value to the measure, and estimating a gamma-value from the desired shift. Both the determined and adjusted measures of central tendency are used to determine the exponent of a tone reproduction curve.

U.S. Pat. No. 6,850,642 by Wang discloses a dynamic range equalization method which includes obtaining a signal indicative of an image and forming an original histogram indicative of the signal, including information indicative of numbers of dynamic range levels in the signal. A mapping function relates each dynamic range level to positions of peaks in the original histogram. The original histogram is scaled based on the mapping function. Widths of peak areas in the original histogram are determined and the dynamic range levels are weighted based on the widths of the peak areas.

BRIEF DESCRIPTION

According to aspects illustrated herein, there is provided a method of automatic mapping of image data which includes representing image data for an image as luminance values, determining a key value as a function of an average luminance value of the image and of minimum and maximum luminance values of the image, generating offset-adjusted luminance values including applying an offset to each of the luminance values, the offset being a function of the determined key value, and computing a tone reproduction curve for at least a region of the image which includes applying a mapping function to the offset-adjusted luminance values.

In accordance with another aspect, an image processing device includes memory which stores instructions for representing image data for an image as luminance values, determining a key value as a function of an average luminance value of the image and of minimum and maximum luminance values of the image, generating offset-adjusted luminance values including applying an offset to each of the luminance values, the offset being a function of the determined key value, and computing a tone reproduction curve for at least a region of the image which includes applying a mapping function to the offset-adjusted luminance values. A processor executes the instructions and outputs a processed image.

In accordance with another aspect, a computer program product includes a computer-usable data carrier storing instructions that, when executed on a computer, cause the computer to perform a method which includes representing image data for an image as luminance values, determining a key value as a function of an average luminance value of the image and of minimum and maximum luminance values of the image, compressing a dynamic range of the luminance values including applying an offset to each of the luminance values to generate offset-adjusted luminance values, the offset being a function of the determined key value, and computing a tone reproduction curve for at least a region of the image which includes applying a mapping function to the offset-adjusted luminance values.

In accordance with another aspect, a method of automatic mapping of image data from a high dynamic range to a low dynamic range, lower than the high dynamic range is provided. The method includes representing image data for a high dynamic range image as a global histogram of luminance values and automatically determining an offset as a function of the overall luminance of the high dynamic range image. The luminance values in the global histogram are compressed in a logarithmic dynamic range compression which incorporates the offset. The image is divided into a plurality of regions, each of the regions being describable by a local histogram of luminance values selected from the compressed global histogram. A tone reproduction curve is computed for each of the plurality of regions of the image which maps the local histogram to output luminance values in the low dynamic range.

DETAILED DESCRIPTION

The exemplary embodiment relates to a system and method for compression of high dynamic range images to images with a lower dynamic range which retains a pleasing and realistic appearance of high dynamic range scenery when rendered on low dynamic range devices.

The technique is suited to use in a fully automated, fast tone reproduction method that reproduces local contrast and fine details of the sceneries without introducing artifacts.

In various aspects, the method includes automatically setting the overall brightness (luminance) of the mapped high dynamic range image in an initial logarithmic dynamic range compression. In various aspects, local histograms are adjusted to reproduce the local contrast and details of high dynamic range image based on a windowed application approach. Noise artifacts may be avoided or reduced by controlling the degree of contrast enhancement in different windows according to the relative uniformity inside the window. The method is able to restrain halo artifacts more effectively than with most local tone reproduction techniques. A similarity weighting function may be introduced to further reduce the artifacts.

Figure 1:
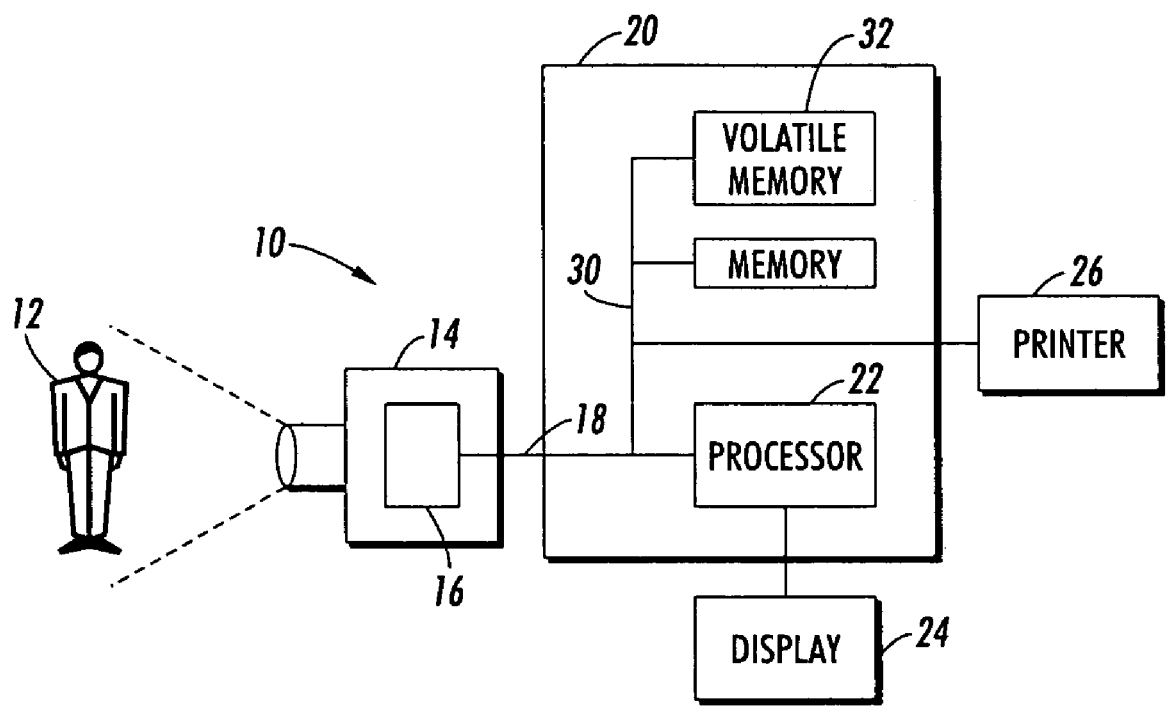
FIG. 1 is a is a functional block diagram of an imaging system according to one aspect of the exemplary embodiment.

With reference to FIG. 1, an imaging system 10 obtains an image, such as an image of a scene 12. The image may be obtained by a high dynamic range image acquisition device 14, such as a camera, scanner, or the like, which may include an active pixel sensor 16 which receives light indicative of the image of the scene 12. The acquisition device converts that light into a signal 18 indicative of pixel-level received signals. The acquisition device may be, for example, a device capable of recording up to 12, 16, or 32 bits per channel. The recorded image may be a still image or a video image. An image processing device 20 includes a processor 22 which processes this image as described herein, to reduce the number of bits of signal dynamic range. The output of the processor 22 may be displayed on a display 24, such as a CRT monitor. Alternatively, the image is rendered on an imaging device 26, such as a printer, which generates an image in physical form on a substrate, such as paper. For these purposes, the processing device 20 may also include a display driver and/or printer driver. The image processing device 20 may be in the form of a general purpose computer or a dedicated processing device. Instructions for the processor may be stored in a separate memory 28, such as RAM or ROM, or the memory may be combined with the processor 22 into a single chip. Components of the image processing device 20 may communicate via a data/control bus 30. During processing, an image may be stored in volatile memory 32.

The image 18, which is produced by the image sensor 16, may have a higher dynamic range that is capable of being displayed on display 22 or rendered on imaging device 24. Accordingly, the operation of the present system maps the brightness histogram of the image to one of lower dynamic range. The processor 22 includes instructions for performing the method, as outlined in the flow diagram of FIG. 2.

It will be appreciated that FIG. 1 is a highly simplified functional diagram of the imaging system 10. However, it is to be appreciated that details of such image processing devices are known and need not be described further.

In one embodiment, a computer program product, such as a disk or other data carrier device is used for installing the instructions on the computer 20 or the instructions may be provided to the computer via a server.

A digital image comprises a collection of picture elements or pixels arranged on a regular grid. A color image contains several colorant channels, usual three or four, to describe the color at a pixel. For example, there may be red, green and blue (RGB) channels, or cyan, magenta, yellow and black (CMYK) channels. Each channel again contains colorant values representing the amount of color at each pixel. In color images, the channels represent the human sensation of brightness or lightness only indirectly, so the color information is transformed to a quantitative representative of brightness prior to mapping to a lower dynamic range.

Three-dimensional color spaces that have one dimension substantially representing human lightness perception are well known in the art. Such spaces typically have a chrominance plane orthogonal to the lightness dimension, which plane represents the chromatic component of color. Different directions from the lightness axis within the chrominance plane correspond to different color hues and distance from the lightness axis, at least approximately, is related to the perceived saturation or vividness of the color. Such a color space may be represented in polar coordinates in which rotation about the lightness axis represents a hue angle or color phase, and distance from the hue axis represents saturation. The lightness axis (or gray scale) may be rendered, for example, as intensity, brightness, luminance, value or luma, and will be referred to herein generally as luminance.

Figure 2:
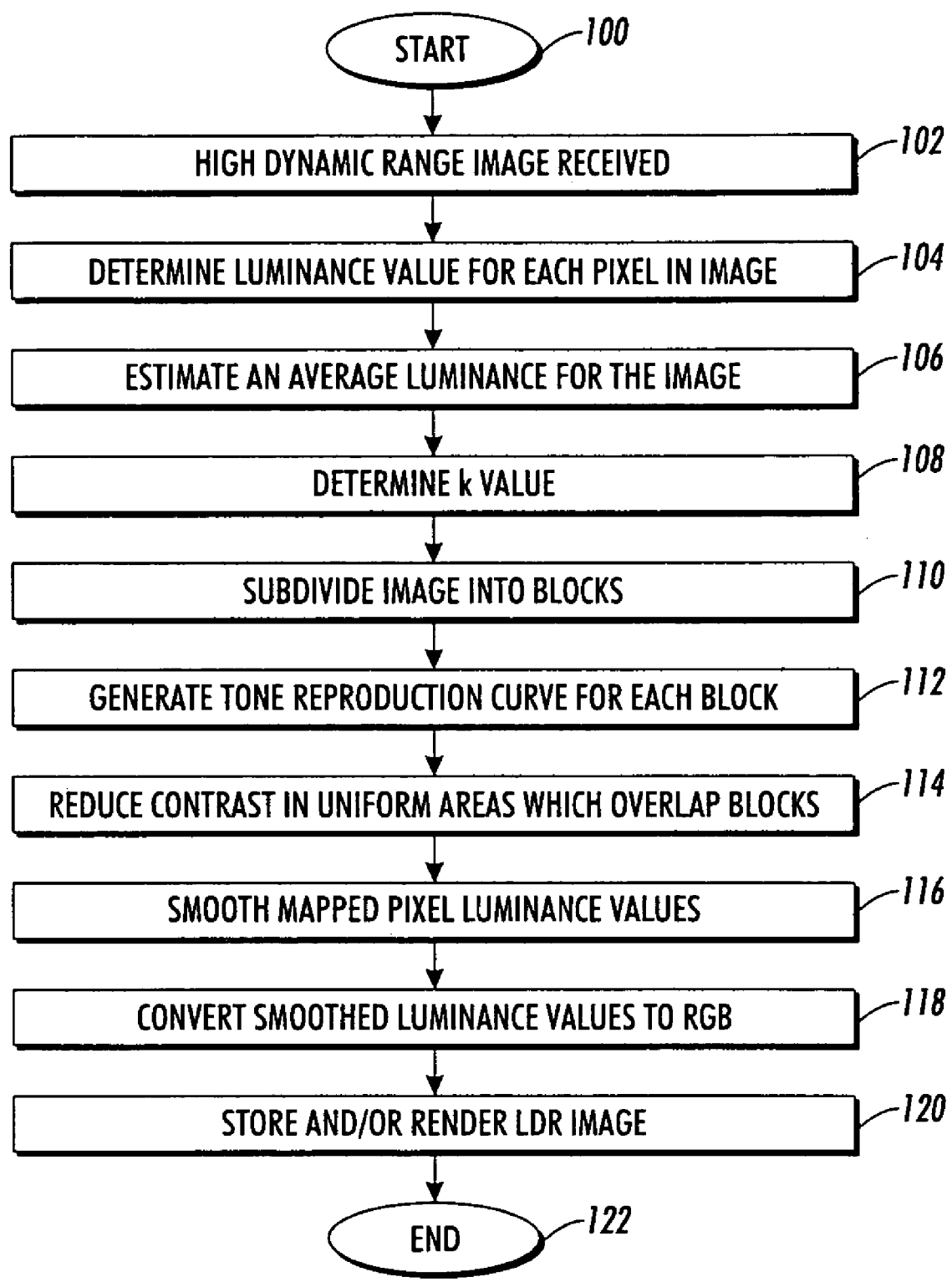
FIG. 2 is a flow diagram of a method for local histogram adjustment based high dynamic range image mapping of an image according to another aspect of the exemplary embodiment.

With reference to FIG. 2, an exemplary method for mapping an image of a first dynamic range (a HDR image) to a second, lower dynamic range (an LDR image) is illustrated. The method includes representing image data in the form of a global luminance histogram and determining an offset for the dynamic range. Next, the dynamic range of the luminance image is compressed and the chrominance re-inserted. The method may include generating local histograms for a plurality of regions in the image. Smoothing techniques may be applied to the luminance values determined to reduce sharp changes at edges of the regions and to minimize halo effects around objects of uniform areas which span two or more regions.

The method begins at step S100. At step S102, image data for an HDR image is received by the processor 20.

Figure 3:
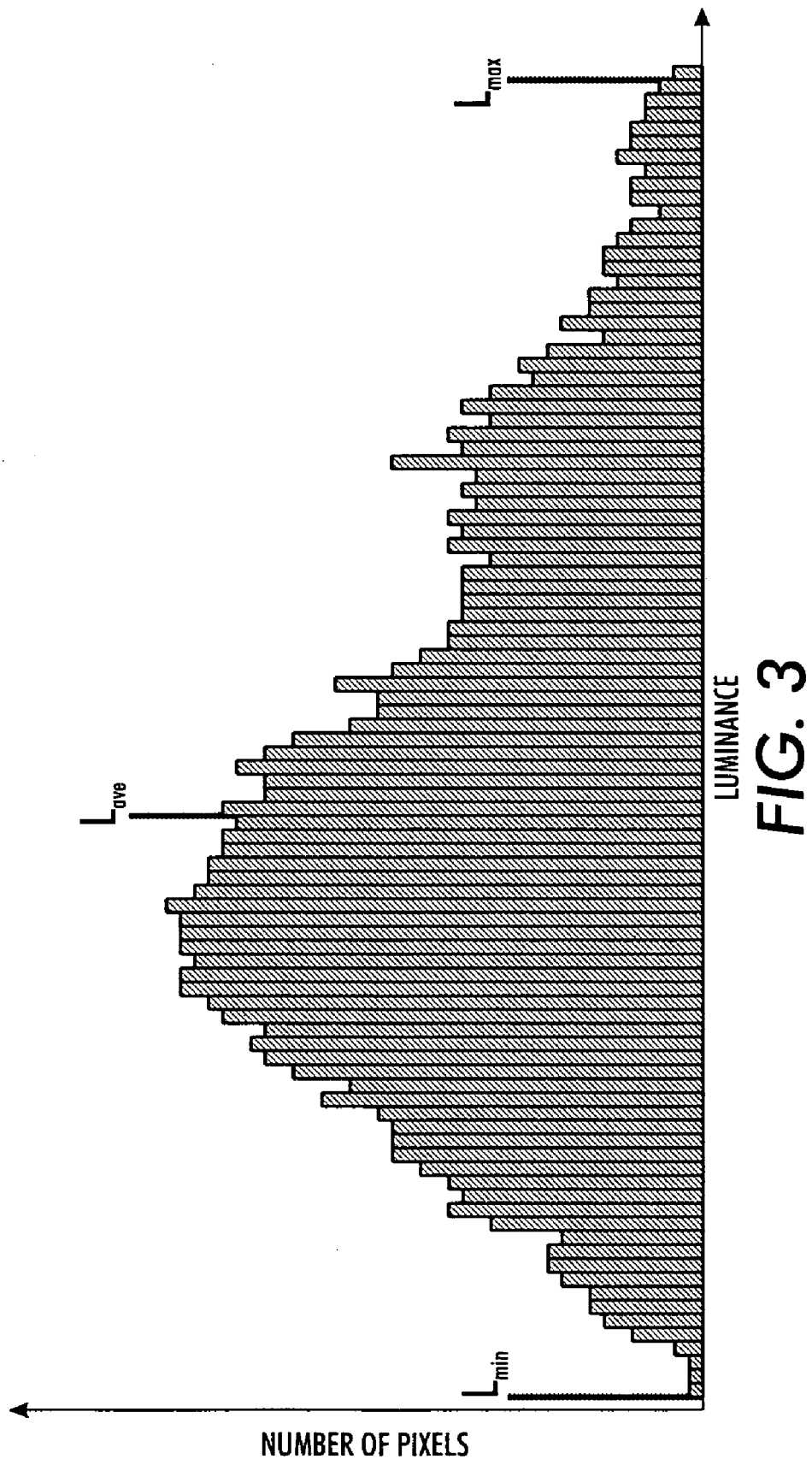
FIG. 3 illustrates an exemplary luminance histogram of an input image.

At step S104, the image data is converted to a global luminance histogram (e.g., a histogram for all the pixels in the image). FIG. 3 illustrates an exemplary histogram, although it will be appreciated that in practice, a high dynamic range image includes many more luminance values than those illustrated.

For each pixel in the image, at step S104, the color components of the pixel may be converted to a luminance value. For example, an average, such as a weighted average of the RGB input may be used to determine the luminance component L. In one aspect, the following equation may be employed:

$$L = 0.299*R + 0.587*G + 0.114*B \qquad \text{Eqn. 1}$$

This step may, of course, not be necessary if the input is already expressed as luminance, such as L*a*b*. The following computations are based on the luminance component L. The RGB color information can be restored after the compression of dynamic range (Eqn. 11).

In steps S106-S110, an offset to be applied in compressing the dynamic range is determined. The offset determines the overall brightness of the mapped image. The dynamic range of the image may be compressed by computing the logarithm of the luminance component L with the offset for each pixel, which may be normalized to produce a value between 0 and 1. Specifically, for each pixel a compressed luminance value D may be computed as follows:

$$D = \frac{\log(L + \text{offset}) - \log(L_{min} + \text{offset})}{\log(L_{max} + \text{offset}) - \log(L_{max} + \text{offset})} \qquad \text{Eqn. 2}$$

where $L_{min}$ is the minimum luminance in the image and $L_{max}$ is the maximum luminance.

As used herein, the maximum and minimum luminance values may be the actual maximum and minimum luminance values for the image or may be determined through averaging a small fraction of the luminance values which fall at the upper and lower ends of the range, respectively. The maximum and minimum luminance values can also be, respectively, some upper and lower percentiles of the luminance distribution. Typically the upper percentile is chosen larger than 90%, while the lower percentile is chosen less than 10%.

In one embodiment, the same offset value is used for the entire image. In other embodiments, an offset is determined for each of a plurality of regions of the image which can be of the same size and shape, although they need not be. In the following discussion, the entire image is considered as one region.

The offset may be estimated automatically, as follows. At step S106 an estimate of the average luminance of the image is determined. For example, the average log-luminance of the entire image may be determined as follows:

$$L_{ave} = \exp\left[\frac{1}{N}\sum_{x,y}\log(\varepsilon + L(x, y))\right] \qquad \text{Eqn. 3}$$

where N is the total pixel number in the image, L(x,y) is the input luminance of a pixel at location x, y, calculated from Eqn. 1, and $\varepsilon$ is a small value (such as about 0.00001) to avoid the singularity that occurs if black pixels (0 values, which have a log of 1) are present in the image.

At step S108, a key value k is determined. The key value is a function of the luminance of the image. Larger key values correspond to brighter images (higher luminance values) and smaller key values correspond to darker images (lower luminance values). The key value of the image may be determined from $L_{ave}$ using the expression:

$$k = r \times s^{\left(\frac{2\log L_{ave} - \log L_{min} - \log L_{max}}{\log L_{max} - \log L_{min}}\right)} \qquad \text{Eqn. 4}$$

where r and s are constants, $L_{min}$ is the minimum luminance in the image and $L_{max}$ is the maximum luminance.

Eqn. 4 is structured to assign a relatively low value of k when the average luminance of the image is closer to lowest luminance value, corresponding to a darker image and a larger k value, when the average luminance is closer to the maximum luminance (a brighter image). The constants may be determined empirically, for example, by generating images with different values of the constants r and s and conducting preference studies with a group of observers. For example, if r is 0.35 and s is 2, which have found to be appropriate values, Eqn. 4 becomes:

$$k = 0.35 \times 2^{\left(\frac{2\log L_{ave} - \log L_{min} - \log L_{max}}{\log L_{max} - \log L_{min}}\right)}$$

where k ranges from 0.175 to 0.70.

At step S110 the offset is determined such that $L_{ave}$ in the image is mapped to the key value determined above on a scale between 0 and 1:

$$k = \frac{\log(L_{ave} + \text{offset}) - \log(L_{min} + \text{offset})}{\log(L_{max} + \text{offset}) - \log(L_{min} + \text{offset})} \qquad \text{Eqn. 5}$$

The offset can be solved using numerical calculation, for example, using the Newton method, within a preselected number of iterations, e.g., about 20 iterations.

Figure 4:
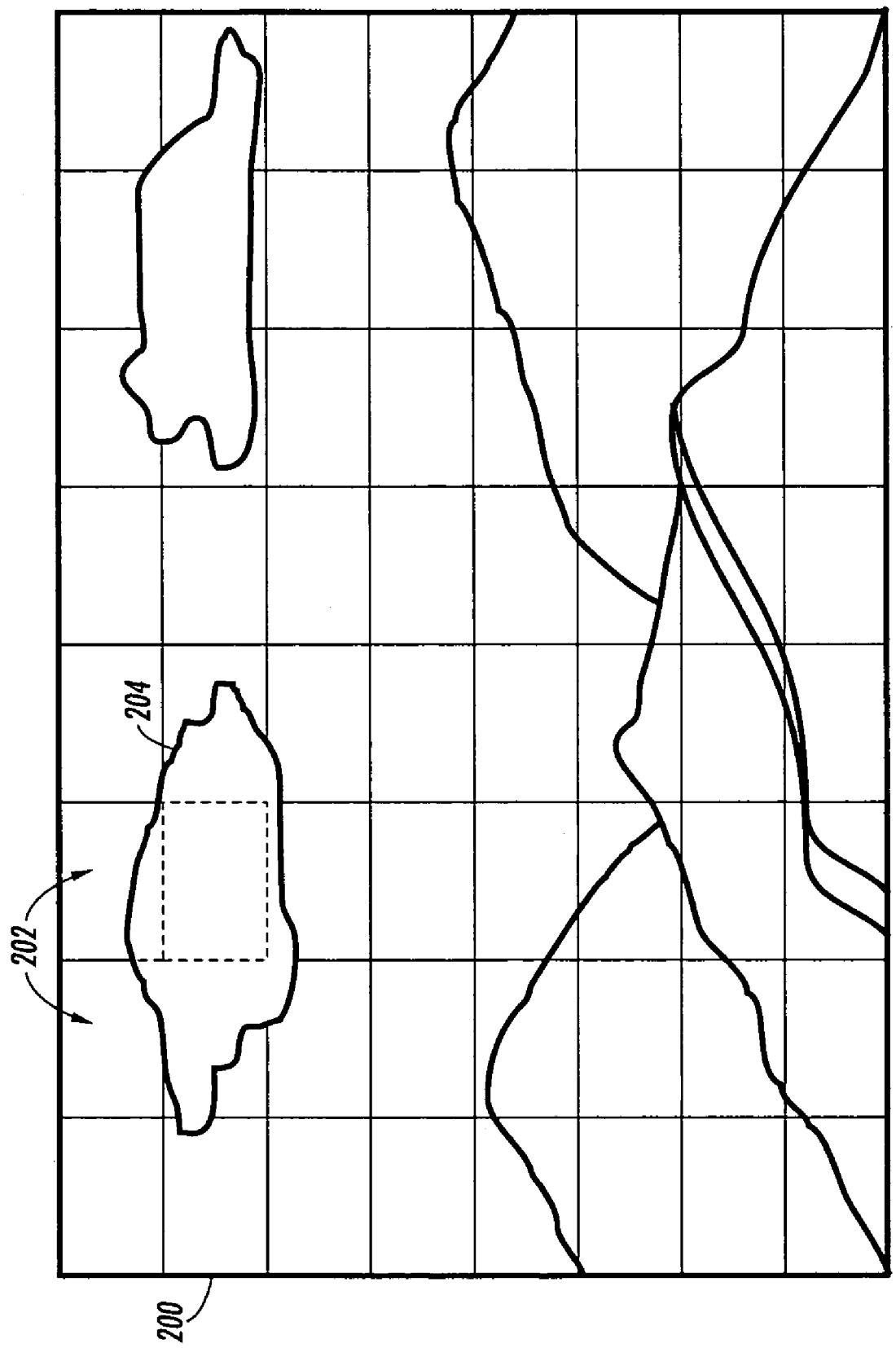
FIG. 4 is a schematic view of an exemplary image subdivided into blocks for processing.

At step S112, the image 200 may be divided into regions, e.g., blocks 202 (FIG. 4). The blocks may be of the same size and shape or different. For example, rectangular blocks, arranged in a matrix, although other shaped blocks, such as triangles or hexagons, are also contemplated. The blocks may be of equal size and shape. The size of the block may depend, to some degree, on the resolution of the image. For example, the image 200 may be divided into from about two to about one thousand blocks 202, e.g., about 64 blocks. The size of the blocks may depend, in part, on the number of pixel in the image. If there are too few pixels in the block, inaccuracies in computation can occur. For example, each block 202 may comprise at least about 500 pixels, and in one embodiment, at least 1000 pixels.

Figure 5:
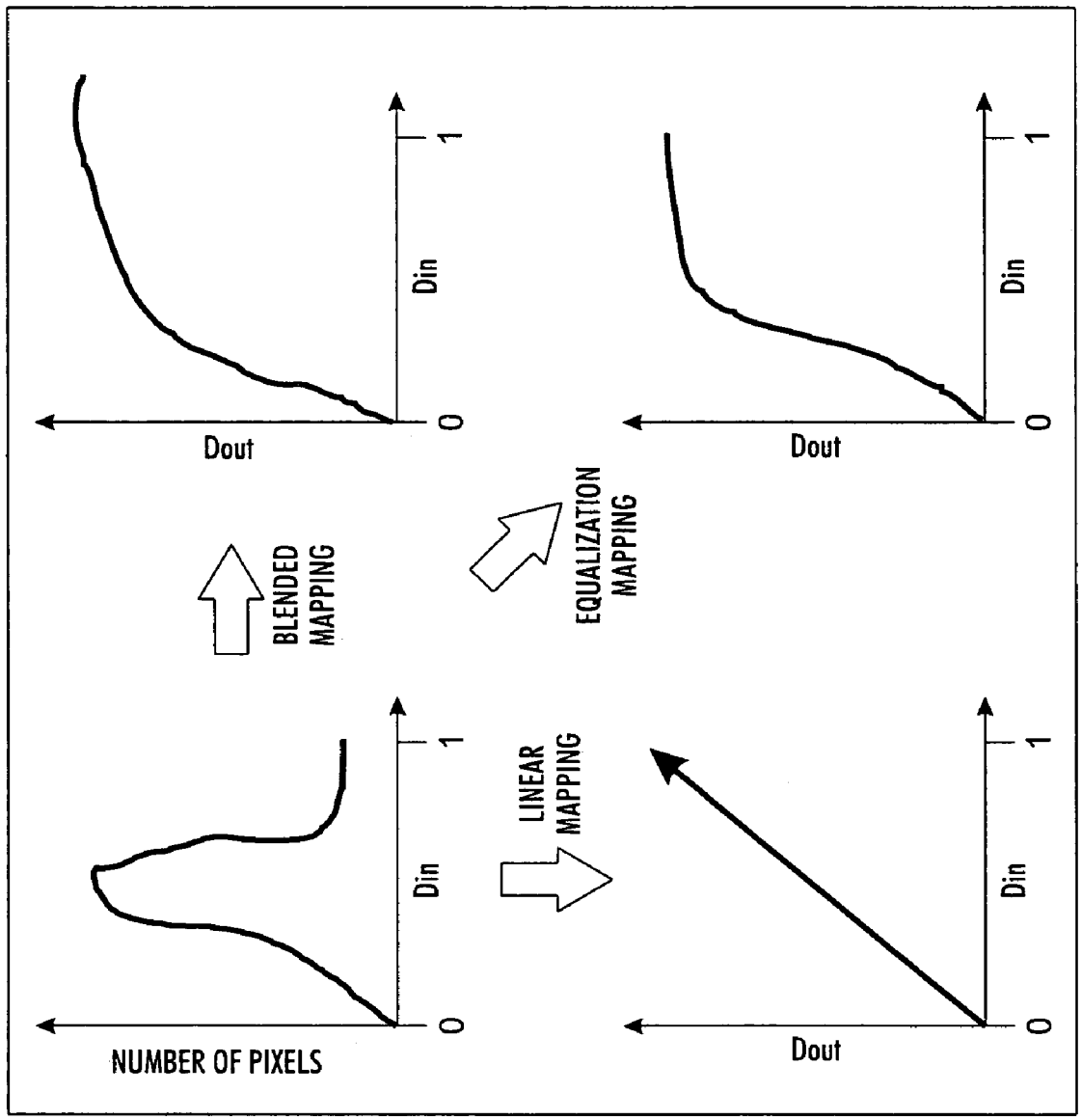
FIG. 5 illustrates mapping functions which may be applied to offset adjusted and normalized luminance values for an entire image or a region of an image; and, FIG. 6 illustrates a weighted averaging process according to a distance weighting function.

At step S114, for each of the blocks, a Tone Reproduction Curve (TRC) is computed based on the histogram adjustment in the local region. Specifically, a local histogram which includes the D values for the pixels in the respective region 202 is generated and mapped to a set of output luminance values within the lower dynamic range selected. Various methods exist for histogram adjustment including histogram equalization mapping and linear mapping, as illustrated in FIG. 5. In a linear mapping method, the input histogram of D values for all the pixels in the block is mapped to an output histogram using a linear mapping function (the output D value is directly proportional to the input D value). For example, the minimum luminance in the histogram may be equated with the minimum of the luminance in the lower dynamic range, and the maximum luminance in the histogram may be equated with the maximum of the luminance in the lower dynamic range. Remaining values of brightness are then constructed by interpolation between these limits. Histogram equalization mapping maintains the brightness ranking of image pixels but redistributes the brightness values so that an equal number of pixels have each possible brightness value. This method stretches the range (giving higher contrast) where there is a large concentration of pixels having the same or similar input D values and compresses the range where there are fewer pixels.

In one embodiment, the technique used to compute the TRCs is based on a mapping function which is a weighted average of two or more mapping techniques. The mapping function may be a weighted average of a histogram equalization mapping function and a linear mapping function. The method may include detecting any regions of the image which exceed a threshold level of uniformity and locally adjusting the mapping function to place a greater weight on the linear mapping function in the detected regions.

For example, the mapping function may be a weighted average of histogram equalization mapping and linear mapping after the initial logarithmic compression with the appropriately determined offset, as shown in Eqn. 6. This histogram adjustment technique is based on the method described in J. Duan and G. Qiu, "Fast Tone Mapping for High Dynamic Range Images," ICPR2004, 17th International Conference on Pattern Recognition, Volume 2, pp. 847-850, 2004. This technique was originally designed for global tone mapping.

$$\text{Pmapped}=TRC[D(x, y)]=\beta*EC[D(x, y)]+(1-\beta)LC[D(x, y)] \quad \text{Eqn. 6}$$

where $0 \leq \beta \leq 1$. EC is the histogram equalization mapping and LC is the linear mapping both after the initial logarithmic compression. Setting $\beta=0$, the mapping is linear, if $\beta=1$, the mapping is histogram equalized. In general, larger values of $\beta$ produce images with more contrast since this weights the equalization method more heavily.

Other histogram equalization techniques are contemplated for generating a TRC, as described for example, in U.S. Pat. No. 6,826,310 to Trifonov, et al., the disclosure of which is incorporated herein in its entirety by reference.

The method of local contrast enhancement outlined above can result in uniform areas 204 of similar pixels being mapped to quite different values. This tends to result in noise. One method to resolve this is to detect the uniform areas and then decrease the contrast enhancement in this region (step S116). An adaptive method may be used to automatically determine the parameter $\beta$ for different local regions. For example, any measure of spread computed on the histogram values may be calculated. Sample measures could be variance, standard deviation, range, inter-quartile deviation, etc. If this measure is larger than a predetermined threshold (e.g., about 18.8 may be used as the threshold if the variance is used as measure of spread), it is regarded as a uniform block. Then, a relatively smaller parameter $\beta$ is used in the local histogram adjustment technique (Eqn. 6). This gives less contrast enhancement in this region.

The exemplary method of contrast enhancement which treats each block individually can result in adjacent areas of similar pixels being mapped to quite different values. In one embodiment, a smoothing technique (step S116) is used to reduce sharp changes from one block to the next. The smoothing technique may include a distance weighting function which generates a weighted average of the output P mapped value provided by the TRC from the block in which a pixel resides as well as those of the TRCs of the (up to eight) adjacent blocks. The weighting may be inversely proportional to the distance of the pixel from the middle of the respective block. Thus, as the pixel is closer to the edge between blocks, greater weight is placed on the TRC of the adjacent block. The weighting function may be further modified according to a similarity function which takes into account the similarity between the pixel input D value and the average D value for the respective neighboring block.

Figure 6:
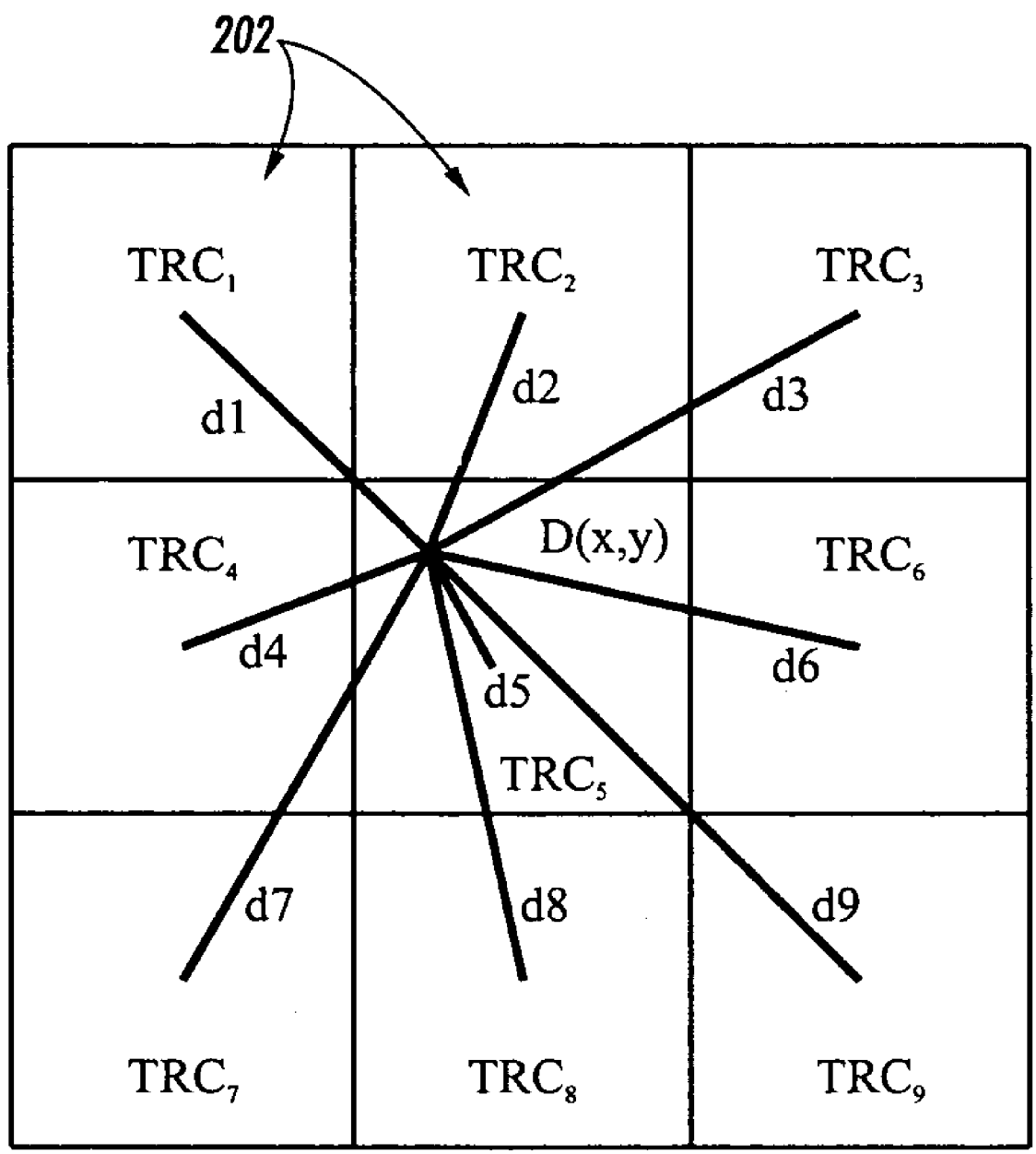

For example, as illustrated in FIG. 6, for each pixel $D(x,y)$ (determined from Equation (2)) in the image, the developed TRCs in its neighborhood blocks are used to transfer it to $TRC_1[D(x,y)]$, $TRC_2[D(x,y)]$, $TRC_3[D(x,y)]$, ... $TRC_9[D(x,y)]$. Then, the final mapped pixel value may be computed as a weighted average of $TRC_1[D(x,y)]$, $TRC_2[D(x,y)]$, $TRC_3[D(x,y)]$, etc according to a distance weighting function and a similarity weighting function as follows:

$$P_{mapped} = \frac{\sum TRC_n[D(x, y)] \cdot w_d(n) \cdot w_s(n)}{\sum w_d(n) \cdot w_s(n)} \quad \text{Eqn. 7}$$

where:

$$w_d(n) = e^{-\frac{d_n}{\sigma_d}} \quad \text{Eqn. 8}$$

$$w_s(n) = e^{-\frac{s_n}{\sigma_s}} \quad \text{Eqn. 9}$$

$$Sn = |D(x, y) - Dmean_n| \quad \text{Eqn. 10}$$

and where $w_d(n)$ is the distance weighting function, $\sigma_d$ is a constant (e.g., 18), $d_n$ is the Euclidean distance between a current pixel position and the center of its neighboring blocks as shown in FIG. 6, $w_s(n)$ is the similarity weighting function, $\sigma_d$ is a constant (e.g., 0.1), $S_n$ is the normalized difference between current pixel value and the average pixel value for the neighborhood blocks ($Dmean_n$).

The distance weighting function favors the preservation of local contrast because it always assigns the largest weighting to the TRC for the block where the pixel is located, while the similarity weighing function increases the chance that similar pixels in uniform areas are mapped to similar values even though they are separated into different blocks. The net effect is that mapped images preserve the local contrast and eliminate halo artifacts which otherwise may tend to occur close to the contours of the objects that neighbor uniform areas.

Optionally, the computation may be reduced by calculating the distance weighting function for all the pixels of only one block. The computed values can then be used for all the other blocks because the relative distances between pixels and neighborhood centers are always the same (assuming blocks of uniform size and shape). Additionally, the calculation of the similarity function can be approximated using a lookup table. An alternative strategy to accelerate the algorithm is to compute the values for low resolution images and then go back to the original size through interpolation.

At step S118 the RGB output is recomposed as a function of the original RGB values and the $P_{mapped}$ luminance values determined using Eqn. 7. Optionally, these may be determined using the following equations:

$$R_{out} = \left(\frac{R_{in}}{L_{in}}\right)^\gamma P_{mapped}, \qquad \text{Eqn. 11}$$

$$G_{out} = \left(\frac{G_{in}}{L_{in}}\right)^\gamma P_{mapped}, \; B_{out} = \left(\frac{B_{in}}{L_{in}}\right)^\gamma P_{mapped}$$

where the gamma parameter $\gamma$ is a constant which controls the color of the mapped image. For example, $\gamma$ is set to 0.5.

The above described method has several advantages. First, local histogram adjustment allows greater contrast to be achieved than can be achieved with histogram adjustment methods relying on global mapping. Second, the initial dynamic range reduction is a logarithmic compression in which the overall brightness can be set automatically using the Newton method. This reduces the need for human interaction, rendering the technique suitable for automated mass printing of images, e.g., in a photoshop environment. Fourth, the method allows halo effects to be minimized and uniform regions to be treated in similar ways. Using different values of $\beta$ in different regions of the image allows contrast to be provided where it is feasible to do so. A method for automatically determining $\beta$, based on histogram measures of spread, is also provided.

The method has been tested for a wide range of high dynamic range images with the exemplary default parameters and shows very positive results. When compared with existing tone reproduction methods, consistently good reproduction was achieved without the need for human input using the present method.

The method finds application in the conversion of high dynamic range image data (usually 12 or 16 or even 32 bits per channel) to a form suitable for visualization on conventional 8-bit low dynamic range reproduction devices such as printers and CRT monitors. Making the reproduced images look pleasing and evoke a visual experience is the focus of the printing industry, photographing industry and computer graphics. The present technique achieves the aim and shows very comparable performance with the best existing techniques in user evaluations. In addition, because the technique is fast and fully automatic, it can be included in an automatic printing pipeline.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of automatic mapping of image data comprising:
   representing image data for an image as luminance values;
   determining a key value as a function of an average luminance value of the image and of minimum and maximum luminance values of the image;
   generating offset-adjusted luminance values including applying an offset to each of the luminance values, the offset being a function of the determined key value the luminance L being normalized according to the equation:

$$D = \frac{\log(L + \text{offset}) - \log(L_{min} + \text{offset})}{\log(L_{max} + \text{offset}) - \log(L_{min} + \text{offset})}$$

where $L_{min}$ is the minimum luminance value in the image and $L_{max}$ is the maximum luminance value in the image; and
   computing a tone reproduction curve for at least a region of the image which includes applying a mapping function to the offset-adjusted luminance values.

2. The method of claim 1, wherein the key value increases in relation to the overall brightness of the image.

3. The method of claim 2, wherein the key value is computed according to the equation:

$$k = r \times s^{\left(\frac{2\log L_{ave} - \log L_{min} - \log L_{max}}{\log L_{max} - \log L_{min}}\right)}$$

where r and s are constants, $L_{min}$ is the minimum luminance in the image, $L_{max}$ is the maximum luminance and $L_{ave}$ is the average luminance.

4. The method of claim 3, wherein the offset is computed according to the equation:

$$k = \frac{\log(L_{ave} + \text{offset}) - \log(L_{min} + \text{offset})}{\log(L_{max} + \text{offset}) - \log(L_{min} + \text{offset})}.$$

5. A method of automatic mapping of image data comprising:
   representing image data for an image as luminance values;
   determining a key value as a function of an average luminance value of the image and of minimum and maximum luminance values of the image, the key value being computed according to the equation:

$$k = r \times s^{\left(\frac{2\log L_{ave} - \log L_{min} - \log L_{max}}{\log L_{max} - \log L_{min}}\right)}$$

where r and s are constants, $L_{min}$ is the minimum luminance in the image $L_{max}$ is the maximum luminance and $L_{ave}$ is the average luminance;
   generating offset-adjusted luminance values including applying an offset to each of the luminance values, the offset being a function of the determined key value k, the offset being computed according to the equation:

$$k = \frac{\log(L_{ave} + \text{offset}) - \log(L_{min} + \text{offset})}{\log(L_{max} + \text{offset}) - \log(L_{min} + \text{offset})}; \text{ and}$$

computing a tone reproduction curve for at least a region of the image which includes applying a mapping function to the offset-adjusted luminance values.

6. The method of claim 1, wherein the computing of the tone reproduction curve comprises computing a different tone reproduction curve for each of a plurality of regions of the image.

7. The method of claim 6, wherein the regions comprise blocks of equal size.

8. The method of claim 6, further comprising:
computing a mapped pixel luminance value for a pixel in the image which is a function of a weighted average of mapped values determined for the tone reproduction curve of a region in which the pixel is located and of tone reproduction curves of regions neighboring the region in which the pixel is located.

9. The method of claim 8, wherein the weighted average is a function of a similarity between the luminance value of the pixel and an average luminance value of a neighboring region.

10. The method of claim 6, wherein the computed key value is the same for each of the regions.

11. The method of claim 1, further comprising:
applying the tone reproduction curve to luminance values in at least the region of the image to generate tone reproduction curve-adjusted luminance values.

12. The method of claim 11, wherein the representing of the image data as luminance values includes computing a weighted mean of colorant values for each pixel, the method further comprising:
computing adjusted colorant values as a function of the generated tone reproduction curve-adjusted luminance values.

13. The method of claim 11, further comprising:
rendering the image on an image rendering device.

14. The method of claim 1, wherein the computing a tone reproduction curve includes mapping the offset-adjusted luminance values to a luminance values having a lower dynamic range.

15. The method of claim 1, wherein the offset-adjusted luminance values are normalized on a logarithmic scale prior to computing the tone reproduction curve.

16. An image processing device comprising:
memory which stores instructions for performing the method of claim 1; and
a processor which executes the instructions.

17. An image processing device comprising:
memory which stores instructions for:
representing image data for an image as luminance values,
determining a key value as a function of an average luminance value of the image and of minimum and maximum luminance values of the image,
generating offset-adjusted luminance values including applying an offset to each of the luminance values, the offset being a function of the determined key value, the luminance L being normalized according to the equation:

$$D = \frac{\log(L + \textit{offset}) - \log(L_{min} + \textit{offset})}{\log(L_{max} + \textit{offset}) - \log(L_{min} + \textit{offset})}$$

where $L_{min}$ is the minimum luminance value in the image and $L_{max}$ is the maximum luminance value in the image, and
computing a tone reproduction curve for at least a region of the image which includes applying a mapping function to the offset-adjusted luminance values; and
a processor which executes the instructions and outputs a processed image.

18. The image processing device of claim 17, further comprising:
at least one of a display and an image rendering device associated with the processor which receives an image output by the processor.

19. A computer program product comprising:
a computer-usable data carrier device storing instructions that, when executed on a computer, cause the computer to perform a method comprising:
representing image data for an image as luminance values;
determining a key value as a function of an average luminance value of the image and of minimum and maximum luminance values of the image;
compressing a dynamic range of the luminance values including applying an offset to each of the luminance values to generate offset-adjusted luminance values, the offset being a function solely of the determined key value, a minimum luminance value in the image, a maximum luminance value in the image, and an average luminance value in the image; and
computing a tone reproduction curve for at least a region of the image which includes applying a mapping function to the offset-adjusted luminance values.

20. A method of automatic mapping of image data from a high dynamic range to a low dynamic range, lower than the high dynamic range comprising:
representing image data for a high dynamic range image as a global histogram of luminance values;
automatically determining an offset value as a function of the overall luminance of the high dynamic range image;
compressing the luminance values in the global histogram in a logarithmic dynamic range compression which incorporates the same offset value for each luminance value for at least a region of the image;
dividing the image into a plurality of regions, each of the regions being describable by a local histogram of luminance values selected from the compressed global histogram; and
computing a tone reproduction curve for each of the plurality of regions of the image which maps the local histogram to output luminance values in the low dynamic range.

* * * * *